United States Patent [19]
Packard et al.

[11] 3,971,165
[45] July 27, 1976

[54] RING MANUFACTURE, PRODUCTIVE OF FACE CONTACT SEAL

[75] Inventors: Norman M. Packard, Des Plaines; John W. Gaines, Wheaton, both of Ill.

[73] Assignee: International Harvester Company, Chicago, Ill.

[22] Filed: June 30, 1975

[21] Appl. No.: 591,787

Related U.S. Application Data

[63] Continuation of Ser. No. 195,955, Nov. 5, 1971, abandoned, and a continuation of Ser. No. 482,309, June 24, 1974, Pat. No. 3,913,199.

[52] U.S. Cl. .................................. 51/131; 51/290; 51/324
[51] Int. Cl.² ..................... B24B 5/36; B24B 37/04; B24B 51/00
[58] Field of Search ............. 51/5 A, 290, 324, 131; 29/156.4 R, 156.5 R, 156.6, 156.63, 222; 277/216, 170, 173

[56] References Cited
UNITED STATES PATENTS

| | | | |
|---|---|---|---|
| 2,929,174 | 3/1960 | Aumiller | 51/290 X |
| 3,073,689 | 1/1963 | Kupfert et al. | 51/324 |
| 3,751,784 | 8/1973 | Packard | 51/290 X |
| 3,918,211 | 11/1975 | Packard | 51/290 |

*Primary Examiner*—C.W. Lanham
*Assistant Examiner*—Dan C. Crane
*Attorney, Agent, or Firm*—John W. Gaines; Floyd B. Harman

[57] ABSTRACT

Methods, apparatus, and improved structure having as their common basis the sequence of collapsing a piston ring in a fixture approximating engine bore diameter, and separately lapping a major portion of the ring side and a remaining locality — narrow in width, of band size and preferably line size — of the side of the ring while it is so collapsed, until circumferentially continuous portions of the side are flat in the range of at least about ten to five light bands. That is, out-of-flatness of the two circumferentially continuous potions, stated another way, is limited in each case to a range equivalent to about five to ten light bands at maximum, at standard inspection wave length. The broadest method disclosed is the use exclusively of rings so carefully made and so lap inspected as above on a percentage basis that the major portion of the side has all points thereon in coplanarity and the remaining locality remaining has all points thereon in coplanarity, all to a degree equivalent to the stated range to seal in respective full face contact and at least full line contact.

9 Claims, 14 Drawing Figures

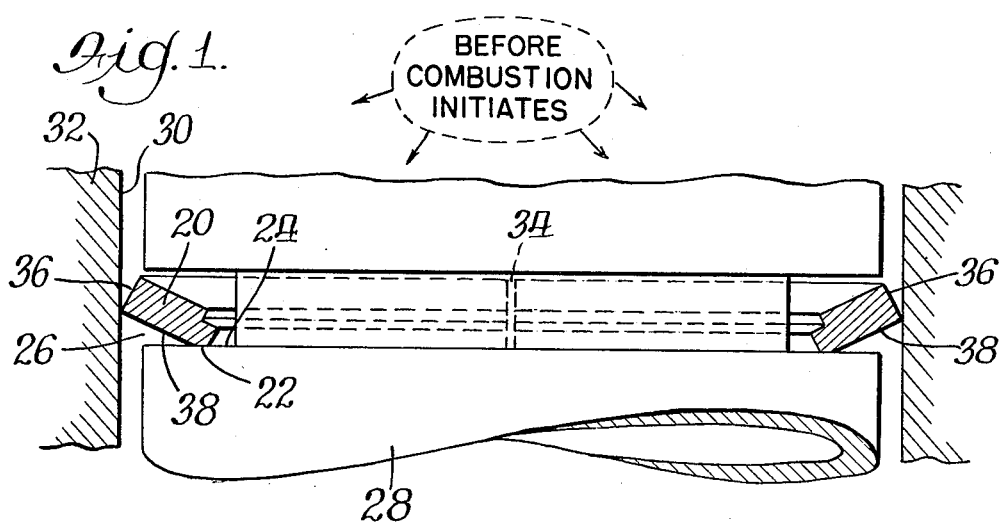
Fig. 1. BEFORE COMBUSTION INITIATES
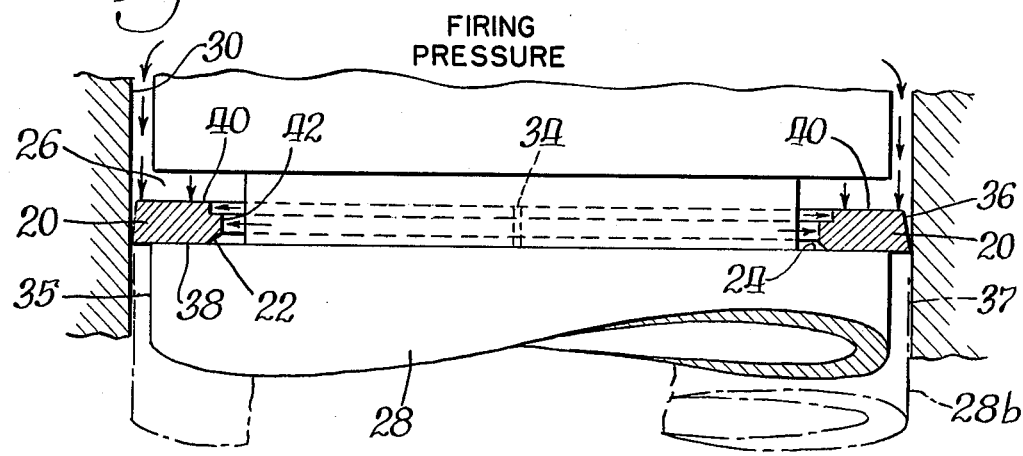
Fig. 2. FIRING PRESSURE
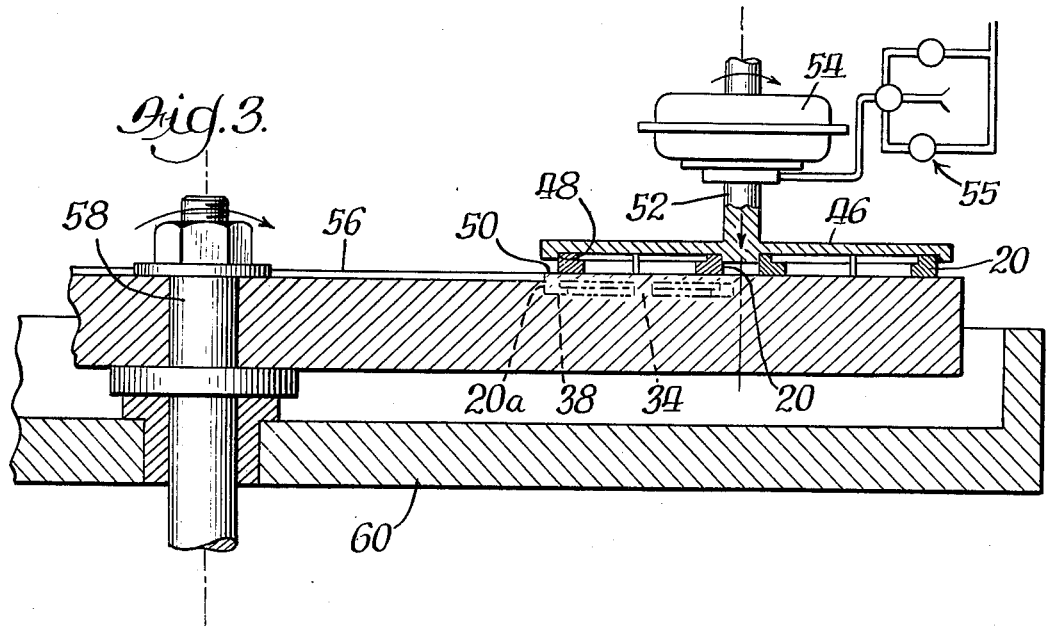
Fig. 3.

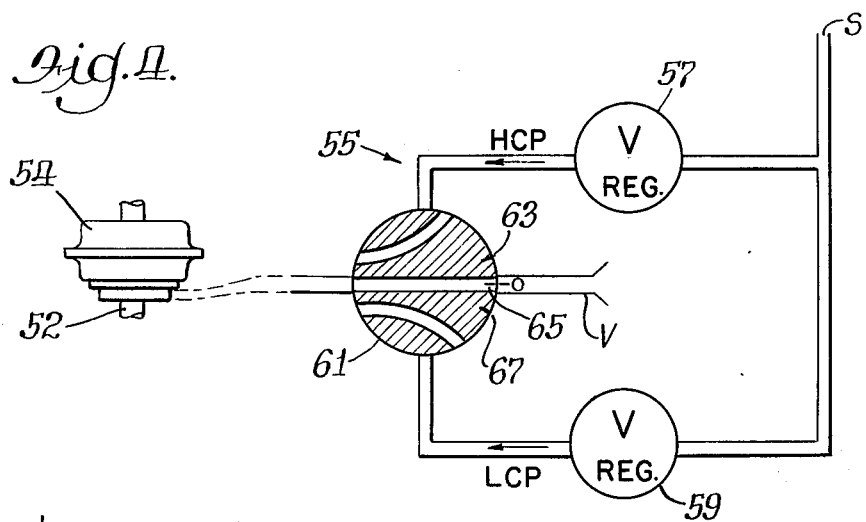
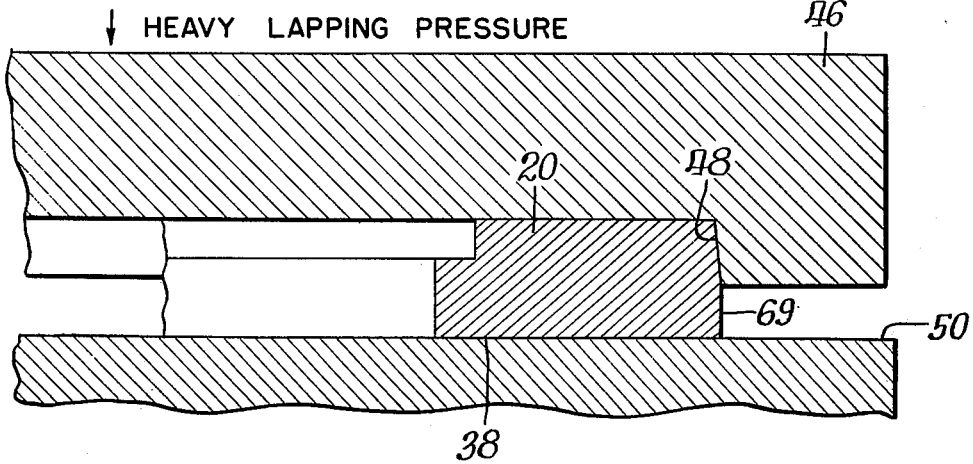
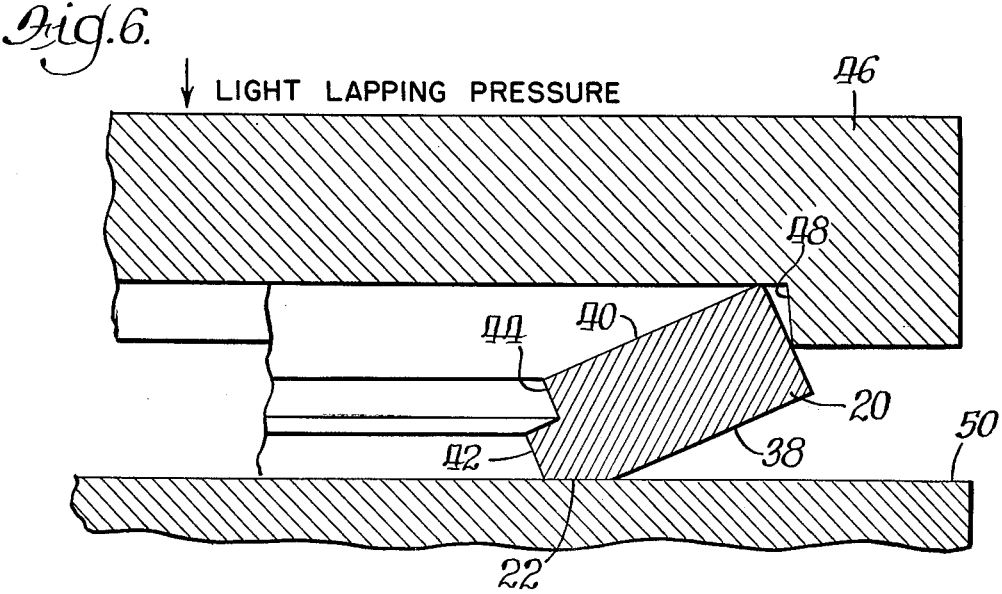

RING MANUFACTURE, PRODUCTIVE OF FACE CONTACT SEAL

This application relates to subject matter of the type generally as shown in U.S. Pat. No. 3,587,155, owned by the same assignee, and is a continuing case of application Ser. No. 195,955 filed on or about Nov. 5, 1971, and now abandoned, and copending application Ser. No. 482,309 filed on Junes 24, 1974 now U.S. Pat. No. 3,913,199.

Our inventions relate to ring manufacture productive of face contact seal. More specifically, they relate to manufacture of a piston ring, received in the compression ring groove of an I.C.E. piston and productive of substantially absolute face contact in the side seal made with the groove.

Blowby presents a problem in production piston engines. The need, as we envision it, is to control blowby so that in production we are capable both of making it predictable and of keeping it at a uniform desirably low value from engine to engine, at least in precision made productive engines which, in general, are of the multi-cylinder type.

Blowby emissions are one of the more obvious air pollutants because several of the polluting constituents thereof are clearly visible as emitted.

Blowby is one of the factors affecting lubricating oil control. Solving the blowby problem will have a material influence on reducing engine oil consumption, and we have discovered that the key to the solution is in the compression rings on the pistons.

According to our inventions, the engines are sealed, i.e., each piston and its surrounding cylinder wall, are mutually sealed by an interposed piston ring either so carefully made or so lap inspected on a percentage basis that one and preferably two conditions obtain. One condition, desirable though not necessarily essential, is that the local inner peripheral edge of the ring at the groove sealing side thereof is coplanar at all points or else so localizedly lapped, in a narrow band along the inner peripheral edge at the side, that the ring will seal the confronting side of a receiving groove in a narrow, substantially continuous ring of pressure contact which amounts to line contact or, at most, is very narrow at the widest points. The resulting narrow if not line-width ring at the side of the piston ring makes up only a minor portion of the overall side. The one condition which is essential is that at least the major portion of the groove sealing side of the ring is coplanar at all points or else so lapped overall, in a wide face seal area, that the ring will seal the confronting side of the receiving groove in a circumferentially uninterrupted ring of face contact. The overall side of the ring which seals the groove side as a aforesaid forms, for its major portion as viewed in cross section, a slight obtuse angle to the groove side and also to, if present, the lapped peripheral locality. Or, viewed in cross section the other way when the ring is in free spring state, the lapped peripheral locality, if any, is an internal frusto cone forming an obtuse angle with the remaining major portion of the side of the ring which is flat.

The disparity in the angularity between the mutually confronting sealed and sealing sides of the respective receiving groove and piston ring is deliberate, and under pressure during compression and firing in the engine cylinder the ring deflects into what amounts to face contact with the groove side over at least the major portion of the side of the ring, thus multiplying to substantial proportions the sealing area at the critical time. So sealing with narrow band contact or line contact, and sealing with face contact, depending upon the presence or absence of high pressure conditions, complement one another to reduce the blowby, i.e., escape of firing pressure into the crankcase by leakage in the cylinders past the pistons. The consequent better regulation of oil film thickness on the cylinder walls — known as oil control — reflects itself by the lowering of oil burning in the combustion chambers and marked reduction in the amounts of fresh oil required to be added to the engine between regular oil changes.

Our inventions thus materially reduce or substantially eliminate the problem of unpredictability and largely uncontrollably high magnitude of blowby, as will now be explained in detail. Features, objects, and advantages will either be specifically pointed out or become apparent when, for a better understanding of the inventions, reference is made to the following description taken in conjunction with the accompanying drawings which show certain preferred embodiments thereof and in which:

FIG. 1 is a longitudinal elevational view of a portion of a piston and cylinder in an engine embodying one of the present ring inventions, the embodiment of FIG. 1 being shown in one of its operating positions in collapsed state;

FIG. 2 is similar, but with the embodiment of FIG. 1 shown in another operating position in collapsed state;

FIG. 3 shows the embodiment of FIG. 1, in the operating position in collapsed state of FIG. 2, but with the environment being a multi-ring lapping fixture to witness the rings for inspection purposes, the fixture being power operated and having fluid controls;

FIG. 4 is a detail view of a portion of FIG. 3, showing the fulid control circuit to larger scale;

FIGS. 5 and 6 are enlarged fragmentary views corresponding to FIG. 3, showing the ring in respective major-portion lapping and remaining-locality lapping positions;

Figure 12:
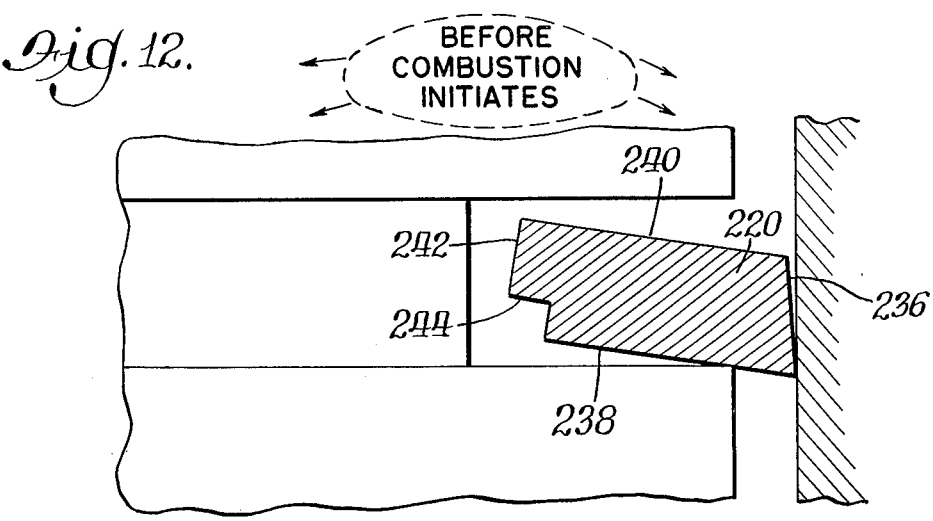
Figure 13:
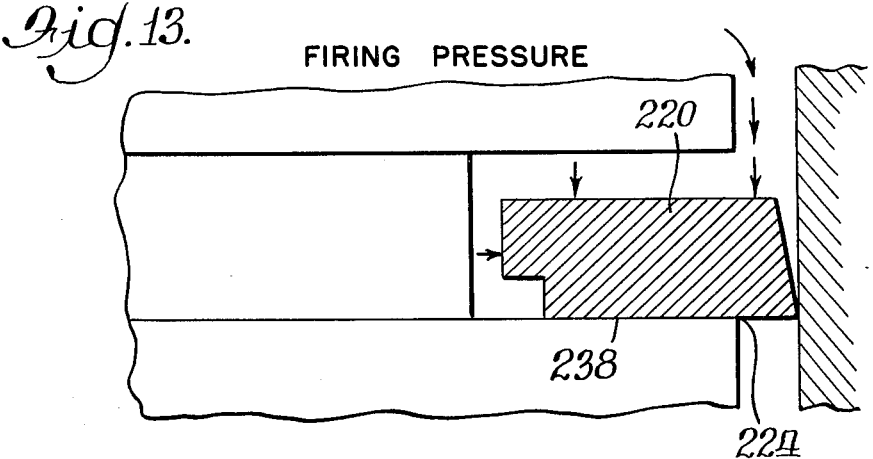
Figure 14:
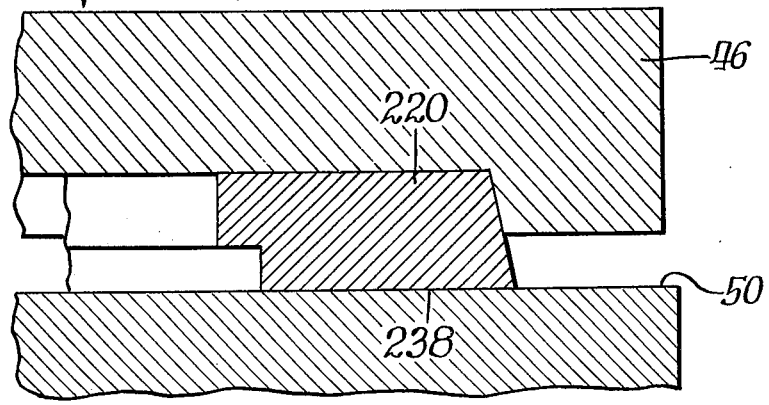

FIG. 12 is an enlarged fragmentary view similar to FIG. 1, but showing a further modification; and FIGS. 13 and 14 are enlarged fragmentary views similar to respective views 2 and 5, but showing the FIG. 12 modification of our invention.

Our inventions about to be particularly described apply to, among others, rectangular positive torsion ring structure, half keystone positive torsion ring structure, and rectangular and half keystone negative torsion or reverse dish ring structure. Slightly oversimplified, a positive torsion rectangular ring is basically one which is twisted in a ring groove of rectangular cross section with the lower side of the ring bearing against the bottom of the groove at the radially inner part of the groove and inclining upwardly and outwardly therefrom. A positive torsion half keystone ring is along the same lines as above but is wedge tapered along the upper side, and the groove top side is complementarily tapered to conform with the wedge shape of the half keystone ring. Finally, the negative torsion rectangular ring twists in a rectangular groove whereby what the ring does is to have the upper side of the ring bear against the top of the ring groove in the inner part of the groove, slanting downwardly and outwardly therefrom, or else what the ring does is to have the lower side of the ring bear against the bottom of the ring groove in the outer part of the groove, inclining upwardly and inwardly therefrom, or else the ring sometimes does both.

All of the rings concerned are the so-called split rings, having a parting located at some point around the circular length of the ring. Each such ring is compressed from its normal relaxed or free state by means of a ring compressor so that it assumes a collapsed state with the parting closed or substantially so. In reaching the collapsed state, the rectangular torsion ring, for example, twists or distorts or dishes out of its normal plane in a well known way dependent upon whether the curved inner face at the back of the ring has been selectively undercut at one side or the other side of the ring. When collapsing, the rectangular torsion ring always takes a dished position with the undercut portion occupying what becomes the concave or internal frusto conical side of the dish.

The metal of the foregoing rings is usually alloyed cast iron or ductile cast iron, and the pistons are cast iron or an aluminum alloy. Pistons in the latter category have the compression ring grooves formed either directly in the aluminum or in hardened, grooved inserts carried by the aluminum piston.

Against this background, it is believed that FIGS. 1, 2, and 3 showing one preferred embodiment of our ring invention can be readily understood in the words of ring terminology.

LOCALIZED SEATED OPERATION, COLLAPSED STATE — FIG. 1

A rectangular positive torsion ring 20 is shown in that one of its operating positions in an engine in which the ring locally seats with the frusto conical side resting on the inside diameter (ID) corner thereof, i.e., with the ring being ID seated, as that eventuality will be hereinafter referred to. When the ring is ID seated, a narrow width ring 22 of pressure contact on the ID of the bottom side establishes at least continuous line engagement with the inner portion of the confronting bottom 24 of a rectangular ring groove 26 in an engine piston 28. The piston reciprocates internally along the wall 30 of a cylinder of a multicylinder engine 32, being sealed to the wall by the ring 20. The ring 20 is a compression ring, and is illustrated in the top or first ring position on the piston although the design is fully effective as the second, third, etc., compression ring on a multiringed piston.

The adjacent ends of the ring defining the parting indicated at 34 are practically touching at the operating temperature of the ring. However, in each engine the designer always takes care (providing a ring gap of 0.010 to 0.020 inch (0.254 to 0.508 mm) is usually an adequate safeguard) to keep the two ends from actual abutment against one another because of the danger that the ring might seize in the cylinder. The ring is thus a live ring, functioning at all times as a cast iron spring preloaded so as to press outwardly against the cylinder wall.

In the collapsed operating state in the groove as shown in FIG. 1, the ring 20 has a twisted position, due to its inherent torsion, during the successive exhaust and suction strokes of the piston 28. The slight acute face angle, which the essentially cylindrical face 36 of the ring makes with the vertical, accounts for a unidirectional oil pumping action produced by the ring.

During the exhaust strokes referred to each of which is in the outward (up) direction, the ring provides good oil control, keeping an oil film on the hone pattern in the wall 30. Actually, the narrow wedge of oil being encountered by the ring exerts hydraulic face pressure, causing a slight radial inward collapse of the ring 20, and preventing it from trapping and pumping the oil upward on the cylinder wall while the ring is so moving upward. During each suction stroke, which is inward, the ring 20 due to the scraping action of the bottom corner of the face 36 thereof collects the oil in the inward (down) direction and forces it downwardly ahead of the ring. The ring does so because there is no longer any hydraulic pressure on the ring face pushing it away from the cylinder wall. The oil cannot readily escape from the groove 26 because of contact between the ring and the top of the groove 26, and thus a bottom or face sealing side 38 of the ring pushes the oil downward.

FULLY SEATED OPERATION, COLLAPSED STATE — FIG. 2

During the successive compression and firing strokes of the piston 28, a localized sealing engagement effected by pressure contact of the seal ring always insures as a first stage of sealing that no appreciable pressure dissipation can take place by leakage past the ring 20. Hence the ring is susceptible to be flattened by the ensuing buildup of pressure. So, by a second stage of sealing, the bottom side 38 of the ring is forced into a fully seated ring area of face seal (FS) contact, i.e., with the bottom side FS seated, as that eventuality will be hereinafter referred to, against the major portion of the confronting bottom 24 of the ring groove 26. In other words, the ring reacts to the pressure by untwisting about the ID corner 22 and the inner portion of the groove bottom 24 as a fulcrum.

The trapped pressure produces a consequent downward and outward force against the respective flat upper side 40 and curved rear side 42 at the back of the ring. Hence, the curved face 36 at its lower corner is both spring loaded mechanically and pressure loaded by gas into essentially leak-free contact with the cylinder wall 30. The ring therefore leaves a residual oil film of sufficient but minimal thickness on the hone pattern in the cylinder wall for lubrication purposes; at the same time the ring scrapes off all excess oil in the inward (downward) direction, thus minimizing the amount of oil on the wall exposed to be burned during the combustion process.

Flatness is essential in the sealing side 38 if effective dynamic face sealing is to be realized. At or near top dead center, the piston 28 rocks or shifts from its broken line position 28a in FIG. 2. The antithrust side 35 of the piston is withdrawn from the side of the cylinder wall and the thrust side 37 is forced against the opposite side of the cylinder wall as the piston takes the broken line position 28b on its downstroke in the bore. Because the ring 20 stays centered in the bore, there is appreciable sliding motion between the ring bottom side 38 and the groove bottom 24 across their interface, which must nevertheless maintain the face seal.

When the ring 20 is FS seated as a result of firing pressure holding the bottom side 38 flat against the bottom 24 of the groove, effective sealing is insured because the flatness of the major portion of the side 38 is preferably in the range of at least about ten to five light bands, at standard inspection wavelength (helium). No greater approach has been found necessary to perfect flatness of the face seal in order to achieve the practical control of blowby desired, although two light bands would, for example, improve the operation at least theoretically.

Anyway, the precise range of flatness is not the matter of basic importance here involved, but rather it is systematic analysis and insurance in all cases of good face sealing contact.

NORMAL RELAXED OR FREE SPRING STATE — FIG. 3

In the free spring state fo the ring having a fully expanded diameter as shown by the broken lines 20a in FIG. 3, the adjacent ends of the ring move to their fully withdrawn position so that they are parted considerably at 34. It is when the ring is unloaded as a spring and in free state, during the ring manufacturing process, that the respective upper and lower sides 40 and 38 are made flat and parallel, and the side 38 is preferably lapped in a lapping fixture to within the range of ten to five light bands or to greater flatness, such as to two light bands flat, at standard inspection wavelength (helium). Hence, the bottom side 38 of the ring presents a fairly precise surface.

In order to make the ring 20 twist because of its cross section, the curved rear side or back 42 (FIGS. 2 and 6) is relieved by an undercut adjacent the top side 40 only, as by a chamfer or, as actually illustrated, by a rabbet or counterbore 44. So there is definite asymmetry in the cross section whereby, when the parting in the ring is closed, the ring dishes into an upwardly concave collapsed form (FIG. 6).

RING CONTROL

The manufactured ring according to our objective has planarity on at least the major portion of the sealing side, when FS seated, to at least about ten to five light bands of flatness as manufactured, at standard inspection wavelength (helium).

It is now within the skill of the art, with careful control in ring manufacture over such variables as metallurgy, temperatures, manufacturing procedure, tempering, and details of ring design such as cross section and the like, to materially increase the proportion of rings in a production run above what could be expected as the happenstance or random group have face seal flatness when the ring is FS seated. (i.e., in face seal contact). So through careful control of the manufacturing process and other variables, the deliberate increasing of the proportions of such rings in the run can be realized to an expectancy of 50% and better, perhaps upwards of 90% or 95%, or possibly of 98%, which will have what can be stated as the coplanarity inherency of the face sealing side of the ring when flattened while in its collapsed state. Stated another way, at least the major portion of the sealing side of the ring in each case will, when flattened while collapsed, be uniplanar.

In such case, the product becomes not the happenstance or exception but the rule, and what essentially amounts to absolute area sealing, i.e., uninterrupted face contact side sealing along the full width of the interface, can be achieved with the ring.

Obviously, a selection-rejection process must be used for witnessing the face sealing face at least to the extent of a spot-check inspection. Although possible, it sounds somewhat idealistic to expect to achieve rings which to a 100% extent have major portions on each of which the locus of all points will fall in one plane when the ring is FS seated. Practical manufacturing does not allow absolute predictability, and certainly the manufacture of positive torsion rings which must be mechanically distorted to install them and gas distorted to flatten them following installation does not allow absolute predictability.

Figure 8:
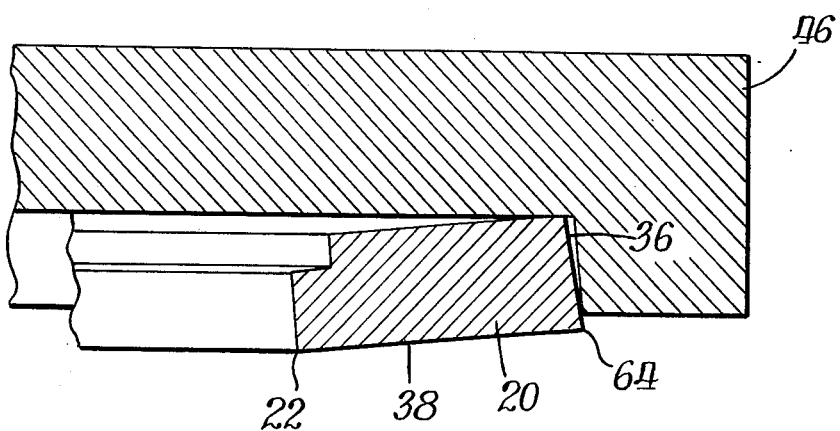
FIG. 8 is a view similar to FIG. 5, but showing a modification of our invention.
Figure 9:
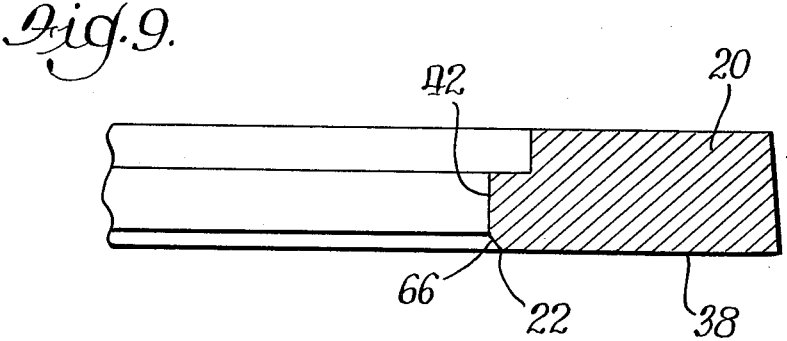
FIG. 9 is a view similar to FIG. 8 but showing a further modification in ring-open position.

The ring of FIGS. 5 and 8 can each be viewed as such a ring having substantially absolute coplanarity along the major portion of the sealing side when mechanically and gas distorted as described, and it will be understood that the parting at 34 (FIG. 2) although greatly exaggerated corresponds to the operative parting or split or gap in the ring in collapsed state in the FS seated position.

The spot-check inspection, referred to, of such production rings is no destructive test, and a ring to be so tested is merely lapped a few test strokes to the point where the resulting uninterrrupted flat face seal surface can be perceived visually. Rings which pass the test when so witnessed are perfectly usable in engines, whereas the rings so witnessed which do not pass the flatness test become rejects. Any reject having two or more high spots or two or more low spots preventing it from passing the visual inspection flatness test would, if salvage or patching were attempted, require the removal of too much metal by lapping to be acceptable thereafter. In other words, a ring is designed for certain characteristics obtainable with a particular volume of metal, and removal of so much metal by lapping would lighten the ring and destroy certain characteristics preventive of the basic design objectives from being realized.

LAP APPARATUS FOR WITNESSING — FIG. 3

An aspect of novelty is believed to reside in the fact that, prior to our discovery of the realities of the matter, there had been and never was any basis for accepting as a foregone conclusion that a positive torsion ring, flat on the bottom side in free state, would so uniformly distort into its pressure flattened, collapsed state as to establish uniplanar face sealing contact with a groove side which was to be face sealed thereby and which was planar or substantially so. Prior to our discovery, it was never appreciated and yet, as a general rule, the usual production-made positive torsion ring when FS seated tended to be noncoplanar along the major portion of its sealing side which presented a succession of high spots and low spots, somewhat according to a wavy or undulating pattern. Hence, there existed no fundamentally orderly and systematic way whereby the engine designer or assembler could predict the amount of blowby which would be produced by each new engine as finally built.

So as to witness on a percentage basis the actual condition during a production run of torsion rings, a multi-ring chuck or fixture 46 holds an annular row of four or more rings 20 each with the sealing side 38 thereof depending and exposed by protruding in the range of about 0.010 inch (0.25 mm) to 0.015 inch (0.40 mm) in the ID seated state. Each of the four or more ring-receiving mouths 48 of the fixture has identical diameter to the cylinder bore size of the engine in which each ring 20 is to be installed.

The lap apparatus includes a raised, annular, planar confronting lap surface 50 against which the rings 20 are pressed by any suitable mechanism such as, for example, a drill press which supports the fixture 40 by means of a vertical stem 52.

Appreciable downward pressure is exerted on the stem 52 by a large diameter air cylinder 54, and rotary motion is imparted to the mechanism under power so as to rotate the stem 52 in the direction indicated by an arrow in FIG. 3. Pressure in the cylinder 54 is maintained by a control circuit 55. Such pressure and powered rotary motion, as a result of the friction torque between the revolving rings 20 and raised lap surface 50, normally impart rotary motion in the direction indicated by an arrow to a table 56 supporting the surface 50.

The table 56 is circular and the lap surface 50 revolves on a spindle 58 rotatably supporting the table 56 above a fixed trough structure 60. Of course, the lower end of the spindle 58 can be connected to a reversible, speed-controlled motor and thus from a table power drive if the rate of rotation or direction of the table 56 is desired to be absolutely controlled.

A full 360° lap results because of the rings revolving relative to the lap surface rotating thereunder. The lap surface 50 displays the usual undistorted mirror flatness and is scored in the usual way with a gridwork of closely spaced apart shallow grooves, not shown. The table drive referred to can be used to advantage, particularly for uniform, positive drive motion.

CONTROL CIRCUIT 55 — FIG. 4

The control circuit 55, preferably pneumatic, is fed by a source S of highly compressed fluid which is introduced to cylinder 54 in a split path through the regulating valve 57 of a high pressure upper branch, and the regulating valve 59 of a low pressure lower branch as viewed in this figure. An interposed selector valve, schematically shown at 61, is operator-operated into positions where its indicia 63, 65, and 67 individually index at the through point O indicated, whereby the valve 61 selectively intercommunicates the air cylinder 54 to the high constant pressure output HCP of the regulating valve 57, to atmosphere through a vent V venting to air, and to the low constant pressure output LCP of the regulating valve 59.

The stem 52 is forced downwardly by pressure in the cylinder 54, which is spring-returned upwardly by a cylinder internal spring, not shown, causing retraction of the stem 52 when the air cylinder 54 is vented to atmosphere. The operator witnessing the rings 20 can therefore put four or more such rings at one time through a lapping cycle, hereinafter described, by exerting heavy and light air pressure force on the rings during the lapping stages as appropriate.

DOUBLE ANGLE LAP, FIRST STAGE — FIG. 5

Novelty is felt to reside in provision of a flat lapped surface on the sealing side fo a ring when radially collapsed while at the same time being torsionally untwisted flat by axial pressure. More particularly, with the ring in its unparted or collapsed state, heavy air pressure force exerted through the fixture 46 untwists the ring 20 into FS seated state, deflected as shown in this Figure toward flat face-to-face contact with the precision lap surface. A brief lapping period ensues.

During the period, the rings 20 move in a circle parallel to the plane of the lap surface, each ring following in the path of the preceding ring 20. The bore-size open mouths 48, actually sockets, are defined by a socket base which is flat and transmits compressive force axially into the rings, and by a short shoulder of the socket which makes the mouth 48 somewhat shallow. The socket shoulder grips a major portion of the generally cylindrical face of the ring with direct, metal-to-metal, frictional contact so that the resisting torque therefrom prevents the ring from relative rotation in the mouth 48.

In practice, the cylindrical ring face, so called, is actually precisely cylindrical at the extreme bottom portion 69 thereof, because of an accurate grinding operation performed thereon at some stage of commercial manufacture. As a technicality, that precisely cylindrical bottom face portion will be understood to be present on all rings disclosed, but will not elsewhere appear in the illustrations.

DOUBLE ANGLE LAPPING, SECOND STAGE — FIG. 6

From the position necessary for the foregoing, wherein the selector valve 61 would have its indicia 67 indexed at the through point O, the valve 61 is rotated by the operator clockwise as viewed in FIG. 4 first to have the indicia 65 index for an instant and second to have its indicia 63 remain indexed at the through point O.

Accordingly, pressure in the cylinder 54 will first be vented to atmosphere at V, and the cylinder 54 will second be re-charged at the light pressure for light lapping as illustrated in FIG. 6. This pressure reduction limiting the fixture 46 to low pressure enables each ring 20 to twist itself under its own torsion into ID seated state, with the protruding inner periphery 22 in contact with, and the major portion of the side 38 forming a slight angle to the lap surface 50.

A second stage of lapping ensues, which is again for a brief period. As before, each of the rings 20 moves in a circle about the stem axis, not shown, as the lap surface 50 slowly rotates with its abrading action, thereunder.

Finally, the lapping tool is stopped, the power cylinder 54 is decompressed and retracts, and the rings 20 are removed from the tool for a visual inspection to complete the witnessing.

REJECTION — FIG. 7

If the ring bottom side 38 as shown in this Figure be visualized as having three or more high spots or some low spots as witnessed during lapping, the ring 20 becomes a reject. The first stage of lapping will disclose the high spots as somewhat shiny whereas low spots will show up dull on the major portion of the sealing side 38 of the ring.

As previously indicated, it is not believed economically sound and it is certainly not desirable to continue the lapping until all high spots and low spots disappear. Time wil be required, coarse and fine lapping compound will be required, and as indicated certain characteristics of the ring will be altered with the weight of metal removed.

SELECTION — FIG. 7

The ring 20 is in free spring state as shown in this Figure, and with its projecting inner periphery 22 presenting a lapped narrow sealing band at the corner which forms an angle of intersection with the major portion of the side 38. The band at 22 is somewhat exaggerated for illustrative purposes; actually, the band is very narrow, indicative of coplanarity of the periphery prior to lapping, and the band widens as shown at 62 adjacent the gap 34, shown open. The reason is that the gap-forming end portions of the ring 20 do not undergo twist, such as, for example, does the ungapped portion of the ring 20 diametric thereto.

So for all practical purposes, the lapped inner periphery 22 is a narrow internal frusto cone which will be flat to at least about 10 light bands with the ring ID seated (i.e., in contact on its inside diameter corner). The inner periphery 22 thus for all practical purposes is coplanar at all points, insuring positive first stage sealing in service.

The major portion of the sealing side 38 makes up the remainder not encroached upon by the lapped narrow sealing band on the periphery 22. When the ring is in the FS seated, collapsed state, the major portion of the side 38 can be said to have literal flatness, with the out-of-flatness measurable and preferably limited to a range the equivalent of no more than about five to ten light bands at standard inspection wavelength (helium). So for all practical purposes, it will be coplanar for positive face sealing under the engine pressures up to and including peak firing pressure, insuring the positive second stage sealing in service.

Figure 7:
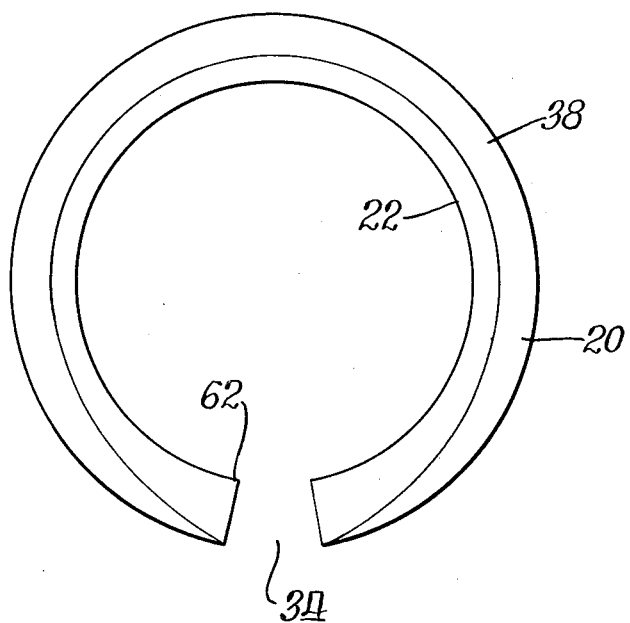
FIG. 7 is a face view of the ring bottom side, which is the sealing side, following double angle lap witnessing.

The ring shown in FIG. 7 will be a selected ring and will be used in engines with the other selected rings and with the non-inspected rings. The latter rings will obviously have a single sealing angle, unlapped, in contrast to the double angle lap surface of selected witnessed rings of this embodiment.

The stage of lapping the ring when ID seated is not always essential, and the operation can be altogether eliminated, as in the example now to be described.

SINGLE ANGLE LAP — FIG. 8

In this example, the ring 20 is selected after the sealing side 38 has been successfully lapped and witnessed in the FS seated, collapsed state, deflected toward flat face-to-face contact with the lap surface. With release of heavy lapping pressure, the ring takes the position shown in solid lines in FIG. 8 and is removed from the fixture 46 and put into use.

The ring 20 is selected because, as witnessed, out-of-flatness in the sealing side 38 will be limited to a range of no more than about five to ten light bands (helium) when in the FS seated, collapsed state (i.e., in face seal contact). And first stage sealing, in the ID seated, collapsed state, can now be conclusively presumed.

In other words, ring control during manufacture is presently within the skill of the art to insure that, with face flatness known to exist on the face sealing side, it is a necessary attendant therewith that the inner periphery 22 thereof will have all points uniplanar when ID seated, to an equivalency of at least about ten light bands flatness. Therefore, two stage sealing will result in service with the line contact at 22 being multiplied by face contact at 38 during the second stage of sealing. The periphery indicated at 22 as viewed in cross section is essentially a knife edge.

The angles involved in the illustrated embodiments inch our inventions are small and the showings have required great exaggeration in order for the angles to be manifest at all. In what amounts to the ID seated, collapsed state of the ring 20 shown in FIG. 8, the residual torsion expends itself when it twists the ring in the groove, not shown, only to the extent that the bottom corner 64 of the ring face 38 is in the range of about 0.0005 to 0.0030 (0.0127 to 0.0762 mm) higher than the inner peripheral edge 22 of the sealing side 38 measured at a point 180° from the ring gap, not shown. Thus, the frusto conicity, in a ring of nominal bore size 4.3 inch for example, forms an acute angle in the range of about ½° to 3°.

Similarly, when the ring 20 is in FS seated, collapsed state, not shown, the ring face 36 is at an acute vertical angle in the range of about 1° to 3°. However, the angles formed with the respective bottom of the ring groove and cylinder wall, though extremely minor, are critical.

The single angle lapped (i.e., inspected by witnessing and selected) and the single angle unlapped (non-inspected) rings as shown in FIG. 8 exhibit a novel and important feature of the inventions in terms of wear-in, compared to prior rings. Inasmuch as the side sealing is right in the first instance, no run-in or wear-in is necessary as with the prior art rings, which in some cases are eventually worn in to effect proper two stage side sealing and which in other cases never wear-in to effect proper two stage side sealing.

There is another feature which is important and which it now is believed will be readily apparent. Operation of an engine equipped with the single angle rings not only does not proceed on a hit or miss basis for side sealing as with the prior art rings, but rather proceeds whereby the ring-receiving groove laps the single angle knife edge in service so as to seal in narrow band contact, and laps the seated face seal so as to retain it flat in service.

It therefore becomes apparent, it is believed, how the same two important features have further application in the respect of eliminating need for wear-in in the first instance, and in the respect of not impairing the integrity of the initially proper side sealing with wear, in service. As applied to double angle lapped rings (FIGS. 1, 2, 3, 6, 7, 10, 11), the ring-receiving groove laps the lapped seated face seal so as to retain it flat in service and laps the lapped inner local band at the ID corner so as to retain it flat in service.

Hence, freedom from blowby pollution of the air is not only insured in the first instance with a new engine, but as a continuing thing as the engine becomes worn.

BLUNTED EDGE — FIG. 9

Because of the effective knife edge formed where the inner periphery 22 intersects the backside 42 of the ring, it is preferable as shown in this Figure to uniformly blunt the ID corner with a very small chamfer or bevel 66. Otherwise, the sharpness of the ring as it twists and also moves laterally of the ring groove can do damage by cutting or gouging the metal in the groove bottom.

For simplicity, however, the chamfer 66 does not appear in most of the showings of the rings hereof.

DOUBLE ANGLE LAP, IN INVERSE STAGES — FIG. 10

Figure 10:
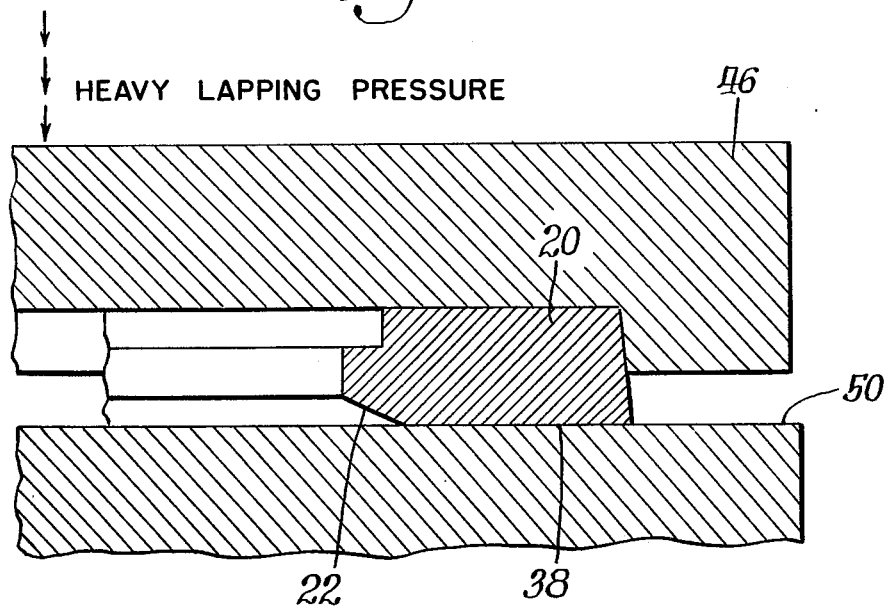
FIG. 10 is a view similar to FIG. 5, but showing another modification.
Figure 11:
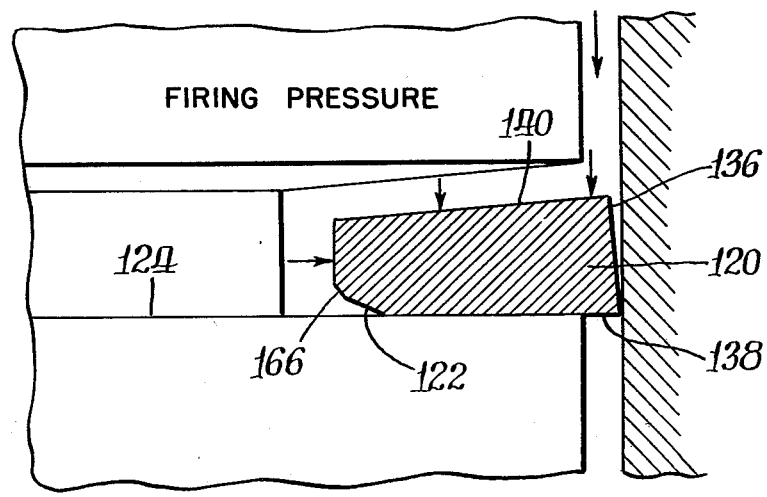
FIG. 11 is an enlarged fragmentary view corresponding to FIG. 2, but showing a further embodiment of the invention.

If the ID corner lap is desired to be included rather than eliminated, the double angle lap can be performed in an inverse order of stages from the preceding embodiment given. Thus if preferred for the results of FIG. 10, the localized lap with the inner periphery 22 under light lapping pressure can be performed first. The valve 61 is moved counter-clockwise as viewed in FIG. 4 so that indicia 63 does not index but indicia 67 indexes. Then as a second stage, the remaining major portion of the sealing side 38 can undergo lapping under heavy lapping pressure as illustrated in FIG. 10.

HALF KEYSTONE RING — FIG. 11

The inventions readily apply to other positive torsion rings, when made and installed as above. In this example, a half keystone ring 120 is untwisted by the gas pressure from its torsionally twisted state into the FS seated position as illustrated in solid lines in FIG. 11.

Under firing pressure when the ring is in the illustrated FS seated, collapsed state, the major portion of the sealing side 138 is flat against the groove bottom 124. The remaining lapped locality 12 is at the inner periphery, and a dulling chamfer is provided on the corner at 166.

The ring 120 has a ring face 136 disposed at an acute vertical angle and a tapered upper side 140. The complementarily tapered top of the groove is frusto conical, inclining upwardly and outwardly.

NEGATIVE TORSION RING — FIGS. 12, 13

A rectangular negative torsion ring 220 according to this example has an upper side 240 and a sealing or lower side 238. In free spring state, not shown, the sides 240 and 238 constitute parallel horizontal upper and lower sides, similarly to the embodiments of the rectangular rings previously described.

Also in similar manner, the negative torsion ring 220 has a face 236 forming an acute vertical angle for oil control purposes described, extending upwardly and inwardly as viewed in FIGS. 12 and 13. Distinctively, however, the ring 220 has a curved back 242 arranged as an inner curved side with an annular portion 244 locally counter bored or rabbetted at the bottom, not at the top as heretofore illustrated. The result is that when the parting in the ring is closed to put the ring in the ID seated, collapsed state as shown in FIG. 12, the upper and lower sides 240 and 238 incline inwardly at a small acute angle to the horizontal and in the up direction (not down direction as heretofore illustrated).

Further distinctively, the ring 220 reacts under firing pressure by untwisting about the outer edge 224 of the groove bottom as a fulcrum. The single angle bottom side 38 in this manner takes the FS seated, collapsed state, deflected toward the flat face-to-face contact to seal against escape of the firing pressure.

SINGLE ANGLE LAP, NEGATIVE — FIG. 14

The negative torsion rings 220 are inspected on a percentage basis. A ring 220 to be selected or rejected is witnessed by a single angle lap operation, under heavy lapping pressure. If the bottom side when lapping starts is planar to at least about ten light bands of flatness, then when the ring 220 is released from the fixture 46 the bottom side 238 will show no high spots or low spots as witnessed. Such ring will belong among the selected rings whereas others which become rejects will be witnessed to be outside of the limits of flatness required.

It is not desirable and, in many case, it is not necessary to have 100% inspection on single angle sealing sides of rings. By 100% inspection is meant single angle lapping of every ring in a production run. It is even less desirable and in many cases unnecessary to have 100% inspection of the double angle sealing sides of the rings. By 100% inspection is meant double angle lapping of every ring in a production run. Thus, within the skill of the art the ring control will be kept careful, and so all unwitnessed rings will be used in engines and most of the witnessed rings will be used because the rejects can reasonably be expected to run few among witnessed rings.

At all events, the witnessed rings selected and the unwitnessed rings are used in the same way in engine manufacture, e.g., in the manufacturing process of an engine provided with a number of cylinders and with that number of pistons individual to the respective cylinders, the pistons having compression ring receiving grooves presenting groove sides associated with the ring sides and being flat or substantially so. The process comprises: selection, from a plurality of split compression rings, of rings for the grooved pistons having at least one side which, for its major portion in the free spring state of the ring, has a consistent overall smoothness, which in the torsionally twisted collapsed state with the ring closed or substantially so, has frusto conicity with the inner periphery of the side protruding and being substantially coplanar at all points on the periphery, and which when the remaining major portion of the side is compressed into flattened state while so collapsed presents a substantially uninterrupted pressure ring of face contact; sealing the pistons with such plurality of compression rings including such rings as so selected by installation of a ring each in an associated compression ring groove on each piston with an associated side of the groove confronting the one side of the ring; and construction of the engines by assembling such pistons in the respective cylinders with each ring engaging a cylinder wall at all times to retain the ring in collapsed state on the piston, and with the ring effective during the exhaust and suction strokes of engine operation to establish a substantially continuous pressure ring of at least line contact between the protruding inner periphery of said one side and its associated confronting groove side to seal the piston, and during the compression and firing strokes of engine operation to establish a substantially continuous pressure ring of fully seated face contact at the interface of the one side and its associated confronting groove side to seal the piston.

Broadly, the basic system here involved is to change from the case hitherto of having a good seal between ring side and groove side solely as the exception of happenstance, and instead to make it the general rule that the ring side and groove side have a substantially continuous ring of face sealed contact when the ring is fully seated against the side of the groove.

Single angle lapping of the sealing side of a ring results in an uninterrupted major band which can readily be perceived visually by the inspector. If a double angle lap is used, as can be desired out of an abundance of caution, an uninterrupted narrow seal band results which can readily be perceived visually. As a practical matter, it has been found that when the narrow band exceeds 0.060 inch width at any point spaced from its ends, the ring is a proper subject for rejection. However, widening of the witness line width is permissible when noted to occur within a fraction of an inch of the gap at the ends of the ring, because the line width tends to widen materially at the gap, up to and including full width of the ring at the gap.

The heavy lapping pressure required is materially less than maximum firing pressure which will be encountered in the engine. A 100 lb. (45 kg) force or several 100 lbs. of force per ring for heavy lapping will be adequate, depending upon the size of the ring to be witnessed. A fraction of 100 lbs. force per ring has, for instance, been found inadequate in the case of a compression ring for a 4.3 inch (102 mm) bore engine. Specifically, a 35 lb (16 kg) lapping pressure on a ring failed to flatten the sealing side against a flat lap surface.

The light lapping pressure employed is from 1 to 4 lbs. (0.45 to 1.81 kg) per ring, and has no appreciable effect in deflecting the ring from its frusto conical ID seated, collapsed state.

Variations within the spirit and scope of the inventions described are equally comprehended by the foregoing description.

What is claimed is:

1. Apparatus for lapping against lapping surface means the side of a split torsion piston ring which, when torsionally distorted by pressure bringing the torsion piston ring into collapsed state conforming to a bore size for which it is normally designed, becomes closed or substantially so, and which, when worked while so torsionally distorted, has at one stage the inner periphery only of said side of the ring projecting into local contact with the confronting lapping surface means, said apparatus comprising:
   a ring fixture having open mouth means for receiving the ring to establish the lapping contact aforesaid;
   a lap surface confronting said mouth means in spaced apart relation to the ring fixture;
   said mouth means having approximately bore size to insure retention of the ring substantially precisely in collapsed state at all times;
   a power cylinder having a compressive-force-transmitting connection to said fixture, effectively with the mouth means of the latter holding the ring relative to the lap surface so that at one stage said side of twisted and under light lap pressure forms a slight angle to said surface whereby the side is provided with a lapped narrow sealing band which is at the locally contacting inner periphery and which forms an angle of intersection with the major portion of the side, and so that at another stage said side if distorted under heavy lap pressure has the major portion thereof compressed untwisted into flattened state against said surface while so collapsed;
   means for causing relative movement between the fixture and lap surface in at least one direction of lap; and
   separate means of two-stage, fluid pressure connection to the power cylinder from respectively a source of light fluid pressure and a source of heavy fluid pressure, whereby at said one stage light fluid pressure in the cylinder causes the lapping force exerted by the ring fixture on the inner periphery of the ring to be limited to a light pressure force, and at said other stage heavy fluid pressure causes the ring fixture to exert a heavy pressure lapping force on said flattened major portion of the ring side.

2. The invention of claim 1, the lap surface characterized by flatness confining it to a plane.

3. The invention of claim 1, the mouth means characterized by a plurality of the bore-size mouths in an annular row about the underside of the fixture.

4. The invention of claim 1, the two-stage fluid pressure connection to the power cylinder effected through a selector valve common to the light and heavy pressure sources, and independently connecting each one's output as a separate means from the other.

5. The invention of claim 1, said mouth means comprising a base, and a gripping shoulder of bore size thereabout and of a depth which is approximately a major portion of, and appreciably shallower than, the thickness of a ring gripped thereby irrespective of whether twisted or untwisted.

6. The invention of claim 1, said relative movement causing means characterized by a table power drive connected to said lap surface.

7. The invention of claim 1, said relative movement causing means characterized by power delivery means for applying torque to said fixture through the compressive-force-transmitting connection of said power cylinder, and means supporting the lap surface for rotation in a plane.

8. Apparatus for lapping the side of a torsion piston ring which, when twisted in collapsed state conforming to a bore size for which it is normally designed, becomes closed or substantially so, comprising:
   a ring fixture having a plurality of open mouth means;
   a lap surface confronting said plurality of open mouth means in spaced apart relation to the ring fixture whereby said mouth means, with respect to a split ring adapted to be operatively interposed in said space and adapted to be held by the ring fixture for lapping a ring side, retains said split ring so that at one stage the inner periphery only of said side of the ring projects into contact with the confronting lap surface;
   said mouth means having approximately bore size to insure retention of the ring substantially precisely in collapsed state at all times, and holding the ring relative to the lap surface so that at one stage said side if twisted and under light lap pressure forms a slight angle to said surface whereby the side is provided with a lapped narrow sealing band which is at the locally contacting inner periphery and which forms an angle of intersection with the major portion of the side, and so that at another stage said side if distorted under heavy lap pressure has the major portion thereof compressed untwisted into flattened state against said surface while so collapsed;
   means for causing relative movement between the ring fixture and lap surface in at least one direction of lap; and
   separate means of two-stage, fluid pressure connection to the power cylinder from, respectively, a source of light pressure and a source of heavy pressure, whereby at one stage light pressure introduced into the cylinder causes the lapping force exerted by the ring fixture on the inner periphery of the ring to be limited to a light pressure force, and at said other stage heavy pressure introduced into the cylinder causes the ring fixture to exert a heavy pressure lapping force on said flattened major portion of the ring side.

9. The invention of claim 8, said mouth means characterized by a ring-gripping shoulder of the bore-size, whereby said shoulder engages a major portion of the face of the ring in a firm metal-to-metal band of contact, which shoulder is manifestly lesser in its corresponding measurement than the thickness of the collapsed ring when untwisted flat, whereby the ring protrudes at one side beyond the face of the relatively shallower mouth 48, and whereby said shoulder by its direct metal friction grip on the ring contributes at least in part in preventing relative rotation of the ring in said mouth means.

* * * * *